(Model.)
J. BLAYLOCK.
PLOW.
No. 280,122. Patented June 26, 1883.
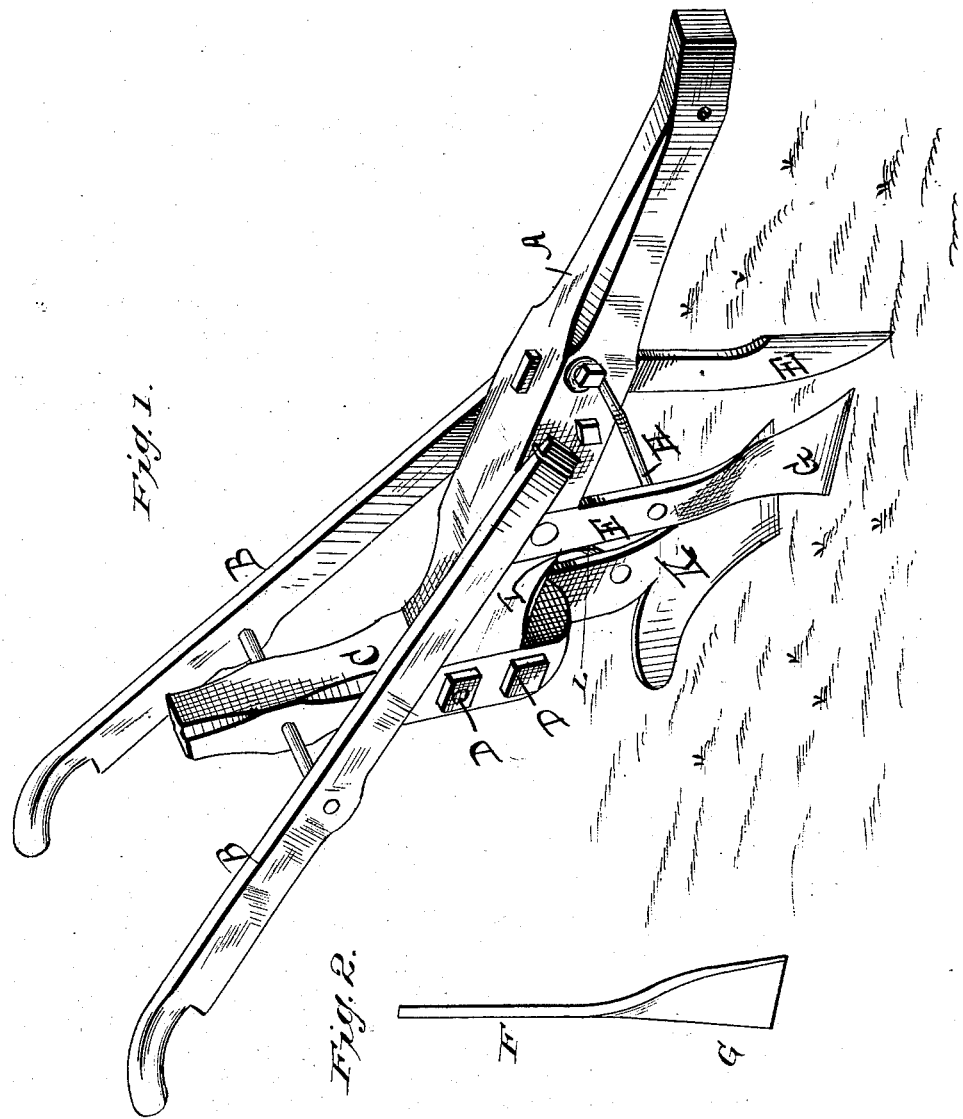
WITNESSES
F. L. Durand
E. H. Bradford
John Blaylock,
INVENTOR
By H. J. Ennis
Attorney

UNITED STATES PATENT OFFICE.

JOHN BLAYLOCK, OF WINONA, MISSISSIPPI.

PLOW.

SPECIFICATION forming part of Letters Patent No. 280,122, dated June 26, 1883.

Application filed December 29, 1882. (Model.)

*To all whom it may concern:*

Be it known that I, JOHN BLAYLOCK, a citizen of the United States of America, residing at Winona, in the county of Montgomery and State of Mississippi, have invented certain new and useful Improvements in Pulverizing-Harrows, of which the following is a specification, reference being had to the accompanying drawings.

This invention relates to certain improvements in plows; and it has for its objects to provide for cutting the sod or soil, then partially turning it, and finally forming the furrow, as more fully hereinafter specified. These objects I accomplish by the means illustrated in the accompanying drawings, forming a part of this specification, and on which like letters of reference indicate corresponding features.

Figure 1 is a perspective view of my improved plow, and Fig. 2 a front elevation of the twisted share and its shank detached.

In the said drawings, the letter A indicates the stock or beam of the plow, which is provided with the handles B, connected to a rear standard, C, attached to the beam by means of bolts and nuts D, or in any other suitable manner.

To the said beam is secured a colter or cutter, E, which is sharpened on its forward lower edge, and the shank of which passes up through the stock or beam and is secured thereto by means of suitable fastening devices, or by simply driving it into a suitable aperture therein. Immediately back of said colter or cutter is secured a plow-shank, F, which has a twisted share, G, at its lower end. The straight edge of said share is immediately in line with the edge of the colter or cutter before mentioned, so that as such colter or cutter cuts the sod or soil the share will partially turn it. The shank of said plow or share is secured to one side of the beam or stock by means of bolts and nuts, or in any other convenient manner, and is braced to said stock or beam by means of the rod H. To the rear standard of the plow before mentioned is secured, by means of the bolts D or otherwise, the shank of the curved or twisted plowshare K. The said plowshare is set so as to travel to one side of the plowshare before mentioned, and is so arranged as to turn the soil partially opened by the said first mentioned plowshare and form a complete furrow. The last-mentioned plowshare and its shank are braced to the plow-beam by means of the rod L, as indicated.

By my improved plow, when in operation, any roots or vegetable obstructions will be first cut, so as to permit the shares or plows to operate to turn the sod or soil. Then the soil will be partially turned by the first plow, G, and finally turned by the rear plow, K, to form a complete furrow.

Having thus described my invention, what I claim, and desire to secure by Letters Patent, is—

The combination, in a plow, of the beam having the handle-standard connected thereto at its rear end, the plowshare secured directly to said standard and to the beam by the brace, the twisted share secured to the beam and braced by the rod, and the colter located forward of the twisted share, the said colter being adapted to open the soil, the twisted share to partially turn the same, and the rear plow to form a complete furrow, substantially as shown and described.

In testimony whereof I affix my signature in presence of two witnesses.

JOHN BLAYLOCK.

Witnesses:
J. W. HILL,
A. A. COLLINS.